(12) United States Patent
Ing et al.

(10) Patent No.: US 12,504,397 B2
(45) Date of Patent: Dec. 23, 2025

(54) SYSTEMS AND METHODS FOR MONITORING OF ACETONE

(71) Applicant: Metre, Inc., Oakland, CA (US)

(72) Inventors: Nicole Leilani Ing, Emeryville, CA (US); Glenn Clifford Forrester, Oakland, CA (US)

(73) Assignee: Metre, Inc., Oakland, CA (US)

(*) Notice: Subject to any disclaimer, the term of this patent is extended or adjusted under 35 U.S.C. 154(b) by 308 days.

(21) Appl. No.: 18/378,835

(22) Filed: Oct. 11, 2023

(65) Prior Publication Data

US 2025/0123233 A1 Apr. 17, 2025

(51) Int. Cl.
*G01N 27/30* (2006.01)
*G01N 27/333* (2006.01)
*G01N 27/404* (2006.01)

(52) U.S. Cl.
CPC ....... *G01N 27/3335* (2013.01); *G01N 27/301* (2013.01); *G01N 27/333* (2013.01); *G01N 27/404* (2013.01); *G01N 27/4045* (2013.01)

(58) Field of Classification Search
CPC ..... G01N 27/301; G01N 27/333–3335; G01N 27/404–4045
See application file for complete search history.

(56) References Cited

U.S. PATENT DOCUMENTS

| 2012/0241378 A1* | 9/2012 | Riviello | G01N 30/00 204/252 |
| 2022/0033979 A1* | 2/2022 | Fujinuma | C25B 11/031 |

* cited by examiner

*Primary Examiner* — James Lin
*Assistant Examiner* — Vivian A Tran
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to a Sensor for monitoring acetone emitted from the surface of the skin. The Sensor includes a gas impermeable enclosure and a carbonate removal cell enclosed within the gas impermeable enclosure. A gas permeable membrane houses the gas impermeable enclosure. A fuel cell anode is situated adjacent to the gas permeable membrane. At least a portion of a reference electrode is enclosed by a first portion of the fuel cell anode. A bottom surface of the carbonate removal cell is composed of a top surface of a second portion of the fuel cell anode. A top surface of the reference electrode and a top surface of the first portion of the fuel cell anode are in contact with a bottom surface of the gas permeable membrane.

12 Claims, 12 Drawing Sheets

300

380

SYSTEMS AND METHODS FOR MONITORING OF ACETONE

BACKGROUND

In the field of computer science, artificial intelligence ("AI") networks, such as neural networks and deep learning networks, are increasingly being employed to solve a variety of tasks and challenging problems. Such AI networks can consist of layers of computational graphs with nodes representing computational operations and connections in between those operations and/or computational graphs with filters representing the extraction of features from input data. Each operation computes or extracts something from the input data and/or previous layer in order to produce output data and/or next layer. Within AI networks there are fairly predefined operations, and there can be, e.g., hundreds or thousands of these operations. Such operations can represent such computational tasks as matrix multiplication and convolution, often using many pieces of input data from within the network.

SUMMARY

Various embodiments of an apparatus, methods, systems and computer program products described herein are directed to a Sensor. In various embodiments, the Sensor may be a transdermal sensor placed on the skin in order to capture vapor emitted from the skin. The Sensor may be worn by a user in order to continually track the user's acetone levels determined from samples of the emitted skin vapor.

Various embodiments of the Sensor for monitoring acetone emitted from the surface of the skin (i.e. transcutaneous acetone). In some embodiments, the Sensor includes a carbonate removal cell enclosed within a gas impermeable enclosure. The gas impermeable enclosure is further enclosed within a gas permeable membrane. A fuel cell is disposed below the gas permeable membrane. The fuel cell, then, is also disposed below the carbonate removal cell. A fuel cell anode is adjacent to the gas permeable membrane. The bottom surface of the carbonate removal cell is also a first portion of a top surface of the fuel cell anode. A second portion of the top surface of the fuel cell anode is in contact with the bottom surface of the gas permeable membrane.

The carbonate removal cell may be disposed above the fuel cell anode in order to mitigate carbonate fouling in the fuel cell. Carbonate fouling in the fuel cell may occur through spontaneous or electrochemical carbonate formation from transdermal and/or atmospheric $CO_2$. By mitigation of carbonate fouling, the longevity, stability and functionality of the Sensor may be preserved or enhanced.

According to various embodiments, the fuel cell anode and cathode are electrodes and may be both composed of a catalyst material, the surfaces of which are exposed to alkaline conditions to enable detection of acetone.

According to various embodiments, the carbonate removal cell comprises a first electrolyte, a second electrolyte, a carbonate removal anode adjacent to the first electrolyte and a bipolar membrane situated between the first electrolyte and a second electrolyte. The carbonate removal cell may also be referred to herein as a water splitting/carbonate removal cell.

According to various embodiments, the fuel cell anode also acts as the cathode for the water splitting/carbonate removal cell (i.e., the carbonate removal cell).

According to various embodiments, the Sensor further comprises an anion exchange membrane adjacent to the fuel cell anode and a fuel cell cathode adjacent to the anion exchange membrane.

According to various embodiments, the anion exchange membrane may be disposed between a fuel cell anode and cathode that are both composed of catalyst material, such as platinum black. The anion exchange membrane may include a polymer backbone to keep the catalyst surfaces of the fuel cell anode and cathodes under alkaline conditions.

Various embodiments may further include a software application for receiving and processing data from the Sensor. The software application may output data indicative of acetone levels and acetone trends.

Various embodiments of an apparatus, methods, systems and computer program products described herein are directed to a Sensor for monitoring acetone emitted from the surface of the skin. The Sensor includes a gas impermeable enclosure and a carbonate removal cell enclosed within the gas impermeable enclosure. A gas permeable membrane houses the gas impermeable enclosure. A fuel cell anode is situated adjacent to the gas permeable membrane. At least a portion of a reference electrode is enclosed by a first portion of the fuel cell anode. A bottom surface of the carbonate removal cell is composed of a top surface of a second portion of the fuel cell anode. A top surface of the reference electrode and a top surface of the first portion of the fuel cell anode are in contact with a bottom surface of the gas permeable membrane.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
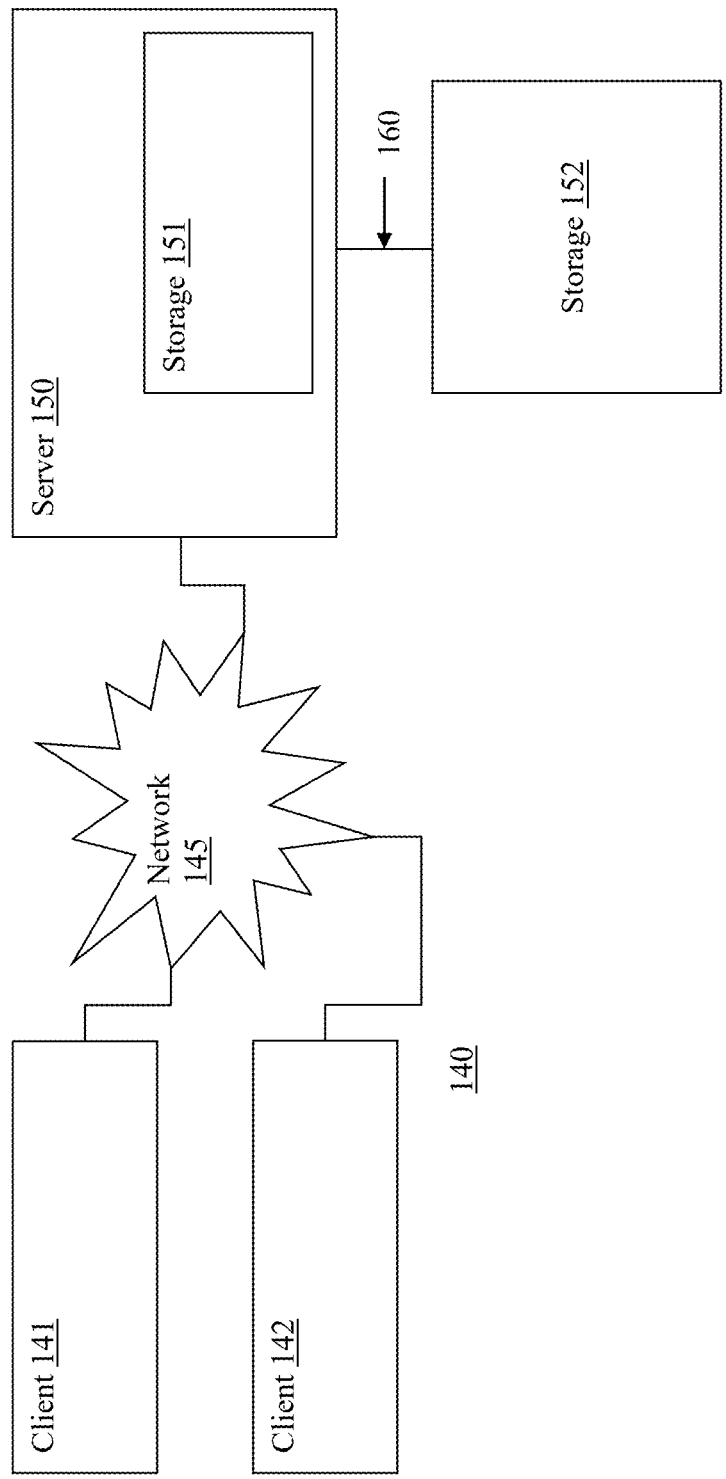
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

The Sensor may include various computing modules, may be connected to various computing modules and/or may communicate with various computing modules. Such modules may further include databases and information maintained in a database may be combined together or further separated in a manner that promotes retrieval and storage efficiency and/or data security. Such modules may be include all or some of the aspects of the embodiments described herein.

Figure 2A:
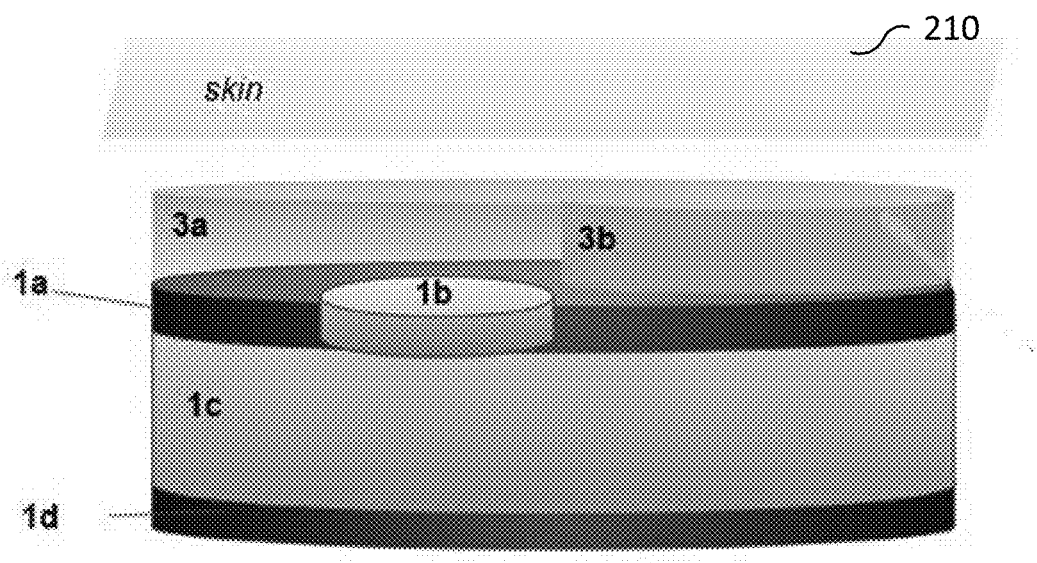
FIG. 2A is a diagram illustrating an exemplary environment in which some embodiments may operate.

As shown in the diagram 200 of FIG. 2A, a Sensor includes components for a carbonate removal cell, such as a carbonate removal anode 2a, a bipolar membrane 2b, a first electrolyte 2c and a second electrolyte 2d. The carbonate removal cell may be entirely enclosed within a gas impermeable enclosure 3b. The gas impermeable enclosure 3b may itself be enclosed within a gas permeable membrane 3a. A fuel cell is disposed below the gas permeable membrane 3a. Since the carbonate removal cell is housed within the gas impermeable enclosure 3b, then the fuel cell is thereby disposed below the carbonate removal cell.

The fuel cell includes a fuel cell anode 1a and cathode 1d. The fuel cell anode 1a is adjacent to the gas permeable membrane 3a. The fuel cell anode 1a may be an electrode. Electrode 1b be composed of platinum, gold and/or silver. The bottom surface of the carbonate removal cell may be composed of a first portion of the top surface of the fuel cell anode 1a, which thereby enables the fuel cell anode 1a to function both as an anode for the fuel cell and, in part, a cathode. A second portion of the top surface of the fuel cell anode 1a may also be in contact with a bottom surface of the gas permeable membrane 3a. An anion exchange membrane 1c is disposed between the fuel cell anode 1a and cathode 1d. In some embodiments, the Sensor may be a wearable mobile computing device that may worn by a user such that the vapor emitted from the skin 210 is received at the gas permeable membrane 3a. However, vapor emitted from the skin 210 does not get transferred to the carbonate removal cell, which is enclosed in the gas impermeable enclosure 3b.

Additional components of the Sensor may be one or more of the following: a humidity sensor, a humidity reservoir, a temperature sensor, and a microprocessor chip enabled with Bluetooth functionality. A current and voltage supply, connected to the fuel cell anode 1a and cathode 1d may also be part of the Sensor. A secondary current and voltage supply, connected to the carbonate removal cell cathode (fuel cell anode) 1a and carbonate removal cell anode 2a may also be part of the Sensor. A hydrophobic membrane may also be disposed adjacent to the fuel cell cathode 1d. For example, a hydrophobic membrane may also be disposed below the fuel cell cathode 1d.

Figure 2B:
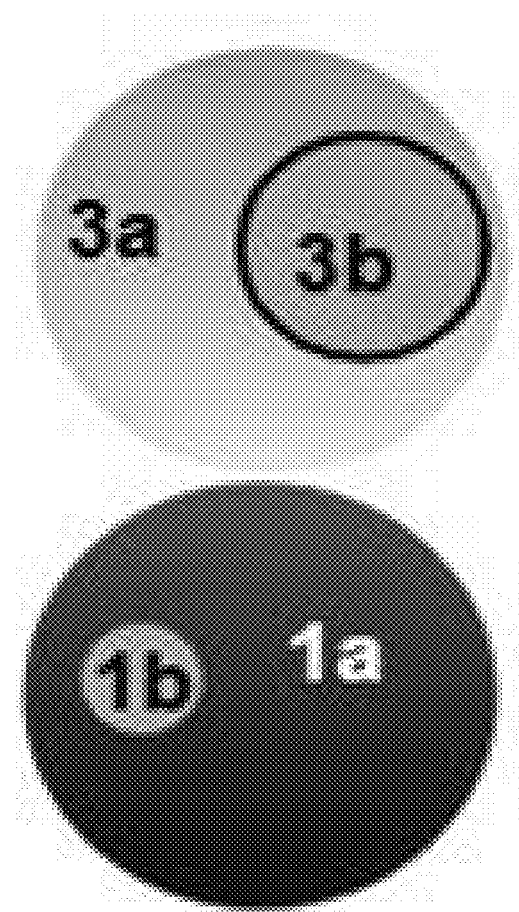
FIG. 2B is a diagram illustrating an exemplary environment in which some embodiments may operate.

A top view of the gas permeable membrane 3a, the gas impermeable enclosure 3b (which houses the carbonate removal cell components 2a, 2b, 2c, 2d), the fuel cell anode 1a and a reference electrode 1b are shown in the diagram 250 of FIG. 2B. It is understood that in various embodiment, the fuel cell anode 1a and the reference electrode 1b are disposed adjacent to the gas permeable membrane 3a. For example, the fuel cell anode 1a and the reference electrode 1b are disposed beneath the gas permeable membrane 3a.

According to some embodiments, the reference electrode 1b improves stability of acetone fuel cell measurements, and if a voltage does need to be applied across the fuel cell, the voltage applied across the fuel cell would be implemented with respect to the reference electrode 1b. Some embodiments may not include the reference electrode 1b. In some embodiments, no portion of the reference electrode 1b has contact with any portion of the carbonate removal cell, since operation of the fuel cell is independent of the functioning of the carbonate removal cell. However, a portion of reference electrode 1b may have contact with with the anion exchange membrane 1c in the fuel cell.

The carbonate removal cell and the reference electrode 1b are oriented according to a misalignment as to each other. The carbonate removal cell is entirely enclosed by the gas impermeable enclosure 3b, which is adjacent to the gas permeable membrane 3a. However, a bottom surface of the carbonate removal cell is not composed of the entirety of the top surface of the fuel cell anode 1a. In addition, the reference electrode 1b does come into contact with the gas permeable membrane 3a. Given the misaligned orientation between the carbonate removal cell 3b and the reference electrode 1b, no portion of the carbonate removal cell is based on the reference electrode 1b even though the bottom surface of the carbonate removal cell is based on a portion of the top surface of the fuel cell anode 1a. The reference electrode 1b may be composed of platinum, gold and/or silver.

Figure 3A:
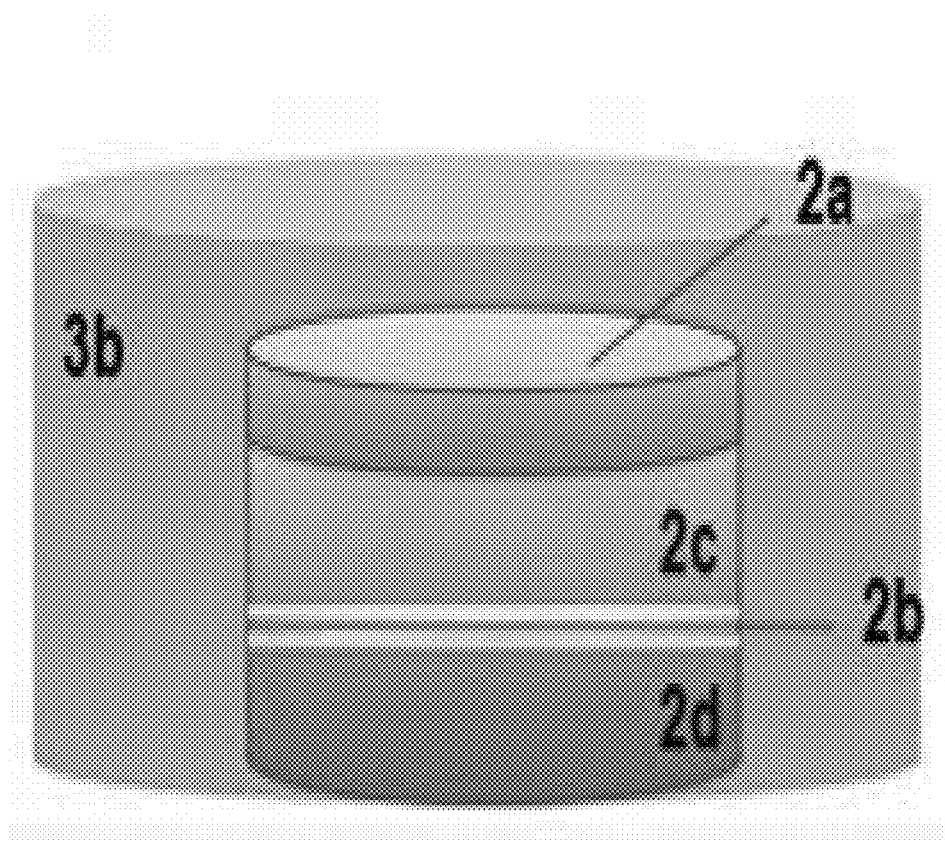
FIG. 3A is a diagram illustrating an exemplary environment in which some embodiments may operate.

As shown in the diagram 300 of FIG. 3A, components 2a, 2b, 2c, 2d for a carbonate removal cell are enclosed within a gas impermeable enclosure 3b. An anode 2a is adjacent to a first electrolyte 2c. A bipolar membrane 2b is situated between the first electrolyte 2c and a second electrolyte 2d. In some embodiments, the second electrolyte 2d comes into contact with the fuel cell anode 1a—but has no contact with any portion of a reference electrode 1b. It is understood that a portion of the fuel cell anode 1a acts as the cathode of the carbonate removal cell housed within the gas impermeable enclosure 3b.

Figure 3B:
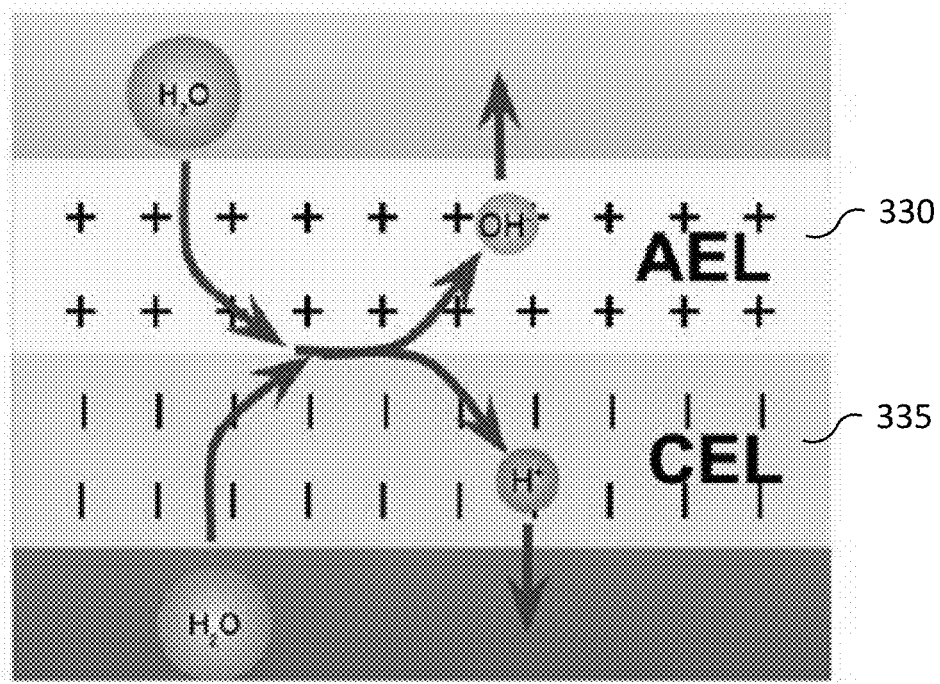
FIG. 3B is a diagram illustrating an exemplary environment in which some embodiments may operate.
Figure 3C:
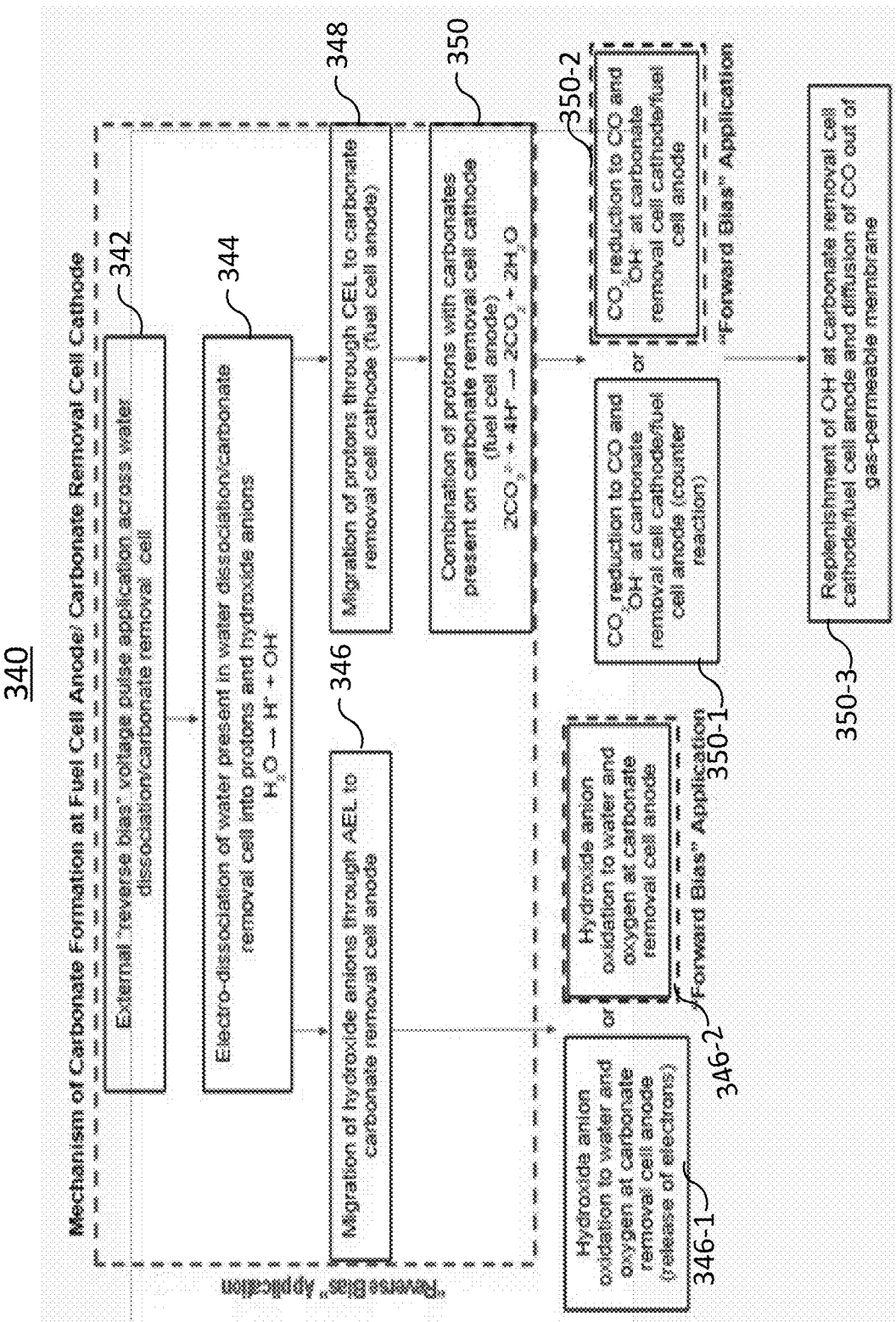
FIG. 3C is a diagram illustrating an exemplary method that may be performed in some embodiments.

As shown in the diagram 320 of FIG. 3B, in various embodiments, water dissociation occurs at the bipolar membrane 2b of the carbonate removal cell 3b. In some embodiments, the bipolar membrane 2b may be composed of an anion exchange layer (AEL) 330 and a cation exchange layer (CEL) 335. When a voltage (i.e. exceeding 0.8 V) is applied across the bipolar membrane 2b (i.e. to the cathode and anode of the water splitting/carbonate removal cell) in "reverse bias", water is dissociated into protons and hydroxide.

As shown in the diagram 320 of FIG. 3B and flowchart 340, in various embodiments, water dissociation occurs at the bipolar membrane 2b of the carbonate removal cell. In some embodiments, the bipolar membrane 2b may be composed of an anion exchange layer (AEL) 330 and a cation exchange layer (CEL) 335. A voltage (i.e. exceeding 0.8 V) is applied across the bipolar membrane 2b in "reverse bias" (i.e. to the cathode and anode of the water dissociation/carbonate removal cell) (Step 342), initiating water electro-dissociation into protons and hydroxide. (Step 344) Hydroxide anions will migrate across the alkaline electrolyte 2c, and protons will migrate across the acidic electrolyte 2d. (Steps 346, 348) Protons will react with carbonates in the portion of the fuel cell anode 1a that functions as the electrode for the carbonate removal cell to form $CO_2$ and water as part of a spontaneous equilibrium reaction. (Step 350) Hydroxide anions in the alkaline electrolyte 2c will thereby undergo oxygen reduction evolution to produce water, oxygen, and electrons. (Step 346-1) This process may can occur without an external voltage application on certain catalyst materials, but may be expedited by the voltage application in "forward bias" (i.e. reverse polarity to the bias used to electro-dissociate water). (Steps 346-2, 350-2) The counter-reaction to the oxygen reduction evolution at the anode 2a is $CO_2$ reduction at the portion of the fuel cell anode 1a that functioning as the carbonate removal cell electrode. (Step 350-1) The $CO_2$ produced from the combinations of protons and carbonates in the first step will subsequently combine with water to form gaseous CO and hydroxide anions at the fuel cell anode 1a, thereby removing $CO_2$ and carbonates from the fuel cell anode 1a. (Step 350-3)

Such voltage applications for carbonate removal may occur during charging of the Sensor to avoid draining a battery associated with the Sensor. For example, the Sensor may be a wearable digital device. The generated hydroxide anions will form water and oxygen at the water dissociation/carbonate removal cell anode 2a, and the generated protons will combine with carbonates embedded within the fuel cell anode 1a, which serves a dual purpose as the cathode for the water dissociation/carbonate removal cell. The water generated from the hydroxide-water recombination can function as the water input for subsequent water dissociation reactions. In some embodiments, a voltage minimum threshold may be required to be applied across the bipolar membrane 2b. For example, a required voltage may have to exceed 0.8V.

Since a portion of the fuel cell anode 1a functions as the cathode for the water dissociation/carbonate removal cell, the second electrolyte 2d of the water splitting/carbonate removal cell is disposed according to a misaligned orientation with the reference electrode 1b.

Charge generated from the water formation reaction at the water dissociation/carbonate removal anode 2a can further be used to directly reduce $CO_2$ into carbon monoxide and additional hydroxide anions at the fuel cell anode 1a (also acting as the carbonate removal cell's cathode). Alternatively, a bias voltage with the opposite polarity of the initial water dissociation bias may be applied to reduce $CO_2$ to carbon monoxide and form additional hydroxide anions at the fuel cell 1a. Through this concerted mechanism, carbonates are removed and hydroxide is replenished in the fuel cell anode 1a. The fuel cell anode 1a may be an acetone fuel cell anode in some embodiments.

In various embodiments, the AEL 330 and CEL 335 of the bipolar membrane 2b may be two thin polymeric films pressed together or two polymeric dispersions cast onto either side of a porous, polymer scaffold. The CEL 335 portion of the bipolar membrane 2b may contain negatively charged side groups, such as sulfonic acid. Examples of CEL 335 materials include, but are not limited to: polystyrene sulfonate, polyvinyl alcohol sulfonate, and sulfonated poly (p-phyenylene oxide). The AEL 330 portion of the bipolar membrane 2b may contain positively-charged side groups and must be alkaline resistant. Examples of AEL 330 materials include, but are not limited to: quaternized poly(arylene piperidinium), quaternized polycarbazole, and quaternized polysulfone.

In some embodiments, the AEL 330 and CEL 335 may be coated with a nanoparticulate catalyst to improve performance and stability. For example, a list of such catalyst materials includes, but is not limited to: Platinum, Iridium oxide, Graphene oxide, Iron oxide, Titanium oxide. In some embodiments, a composite or alloy of catalyst materials may be utilized, such as platinum, iridium oxide.

Figure 3D:
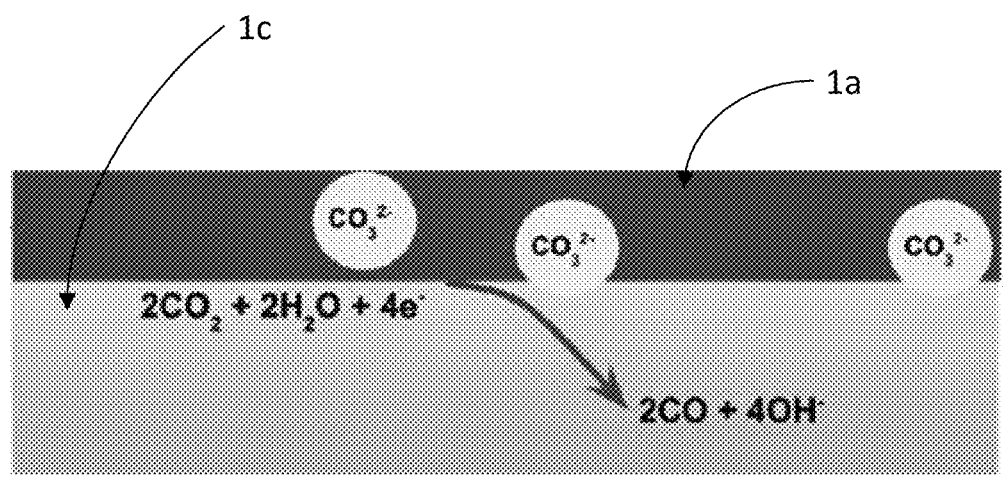
FIG. 3D is a diagram illustrating an exemplary environment in which some embodiments may operate.

As shown in the diagram 380 of FIG. 3D, in various embodiments, water is input into the bipolar membrane 2b of the water dissociation/carbonate removal cell. The water is present within the water dissociation/carbonate removal cell and carbonates are likely to be present throughout the fuel cell anode 1a as a result of atmospheric or transdermal $CO_2$ reacting with the portion of the fuel cell anode 1a acting as the carbonate removal cell's electrode under alkaline conditions.

Figure 4:
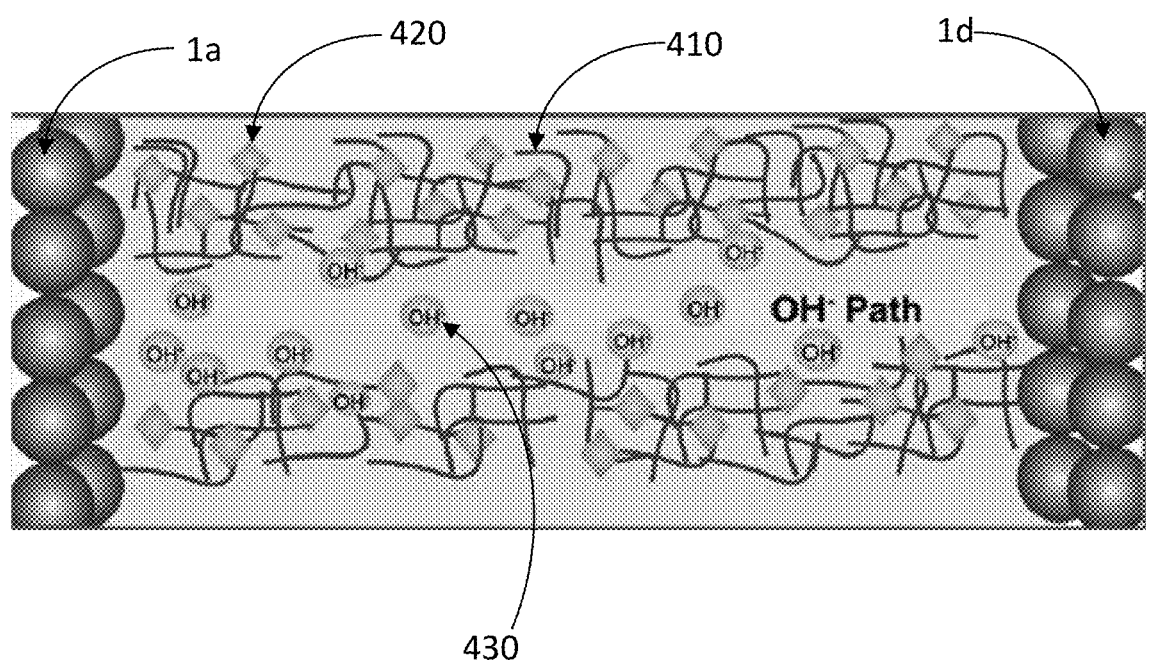
FIG. 4 is a diagram illustrating an exemplary environment in which some embodiments may operate.

The diagram 400 of FIG. 4 shows a schematic of hydroxide transport throughout the fuel cell's anion exchange membrane 1c operating under alkaline conditions. In various embodiments, a catalyst material, such as Platinum (Pt) black, may be deposited on either side of the anion exchange membrane 1c, thereby forming the fuel cell anode 1a and fuel cell cathode 1d, respectively. The anion exchange membrane 1c may include a polymer backbone 410, an immobile cationic group 420 and mobile hydroxide anion 430.

In some embodiments, the anion exchange membrane 1c may be composed of an alkaline-stable polymer, such as, for example: poly(arylene sulfide), poly(arylene oxide), poly (imide), or poly(benzimidazole), poly(arylpiperidinium), poly(vinyl alcohol), or others. Some of these polymers, such as poly(vinyl alcohol), poly(ethylene glycol), or poly (arylene oxide), may potentially be used as hydroxide donors. The anion exchange membrane 1c may also become hydroxide-rich through alkaline electrolyte activation (i.e. providing ~1M NaOH or KOH).

Figure 5:
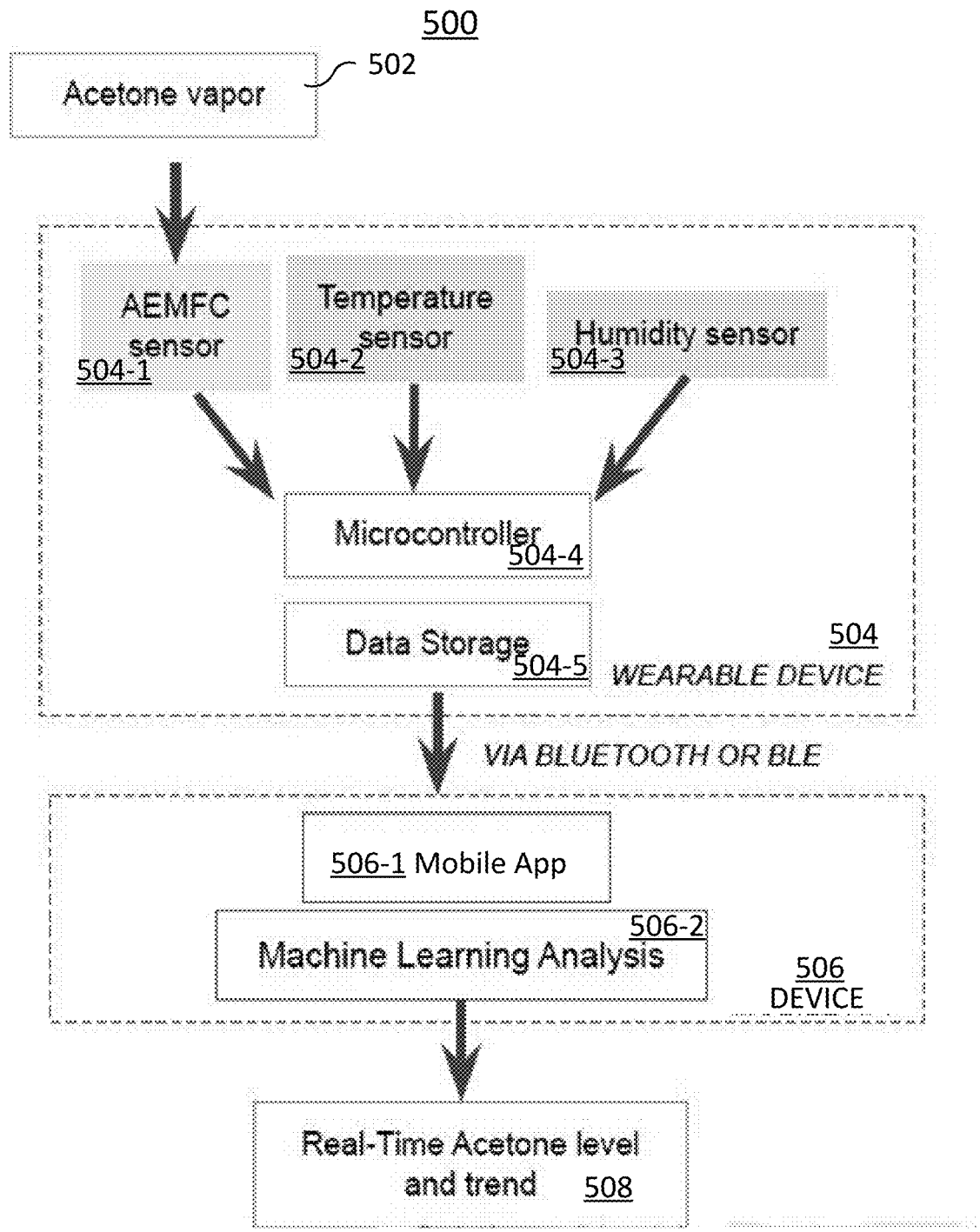
FIG. 5 is a diagram illustrating an exemplary environment in which some embodiments may operate.

As shown in the diagram 500 of FIG. 5, acetone vapor 502 may be emitted from skin. A wearable device 504 may include a sensor 504-1 that itself includes the carbonate removal cell 3b and the components of a fuel cell 1a, 1b, 1c, 1d. The wearable device may include a temperature sensor 504-2, a humidity sensor 504-3, a microcontroller 504-4 and data storage 504-5. The wearable device 504 determines levels of acetone from samples of the acetone vapor 502. The wearable device 504 transmits data representative of the determined levels of acetone to a computing device 506. For example, the computing device 506 may be a mobile computer device (such as a smartphone) that is separate from the wearable device 504. A software application 506-1 is installed on the computing device 506. At least a portion of the transmitted data from the wearable device 504 is fed into the software application 506-1.

In some embodiments the software application 506-1 may perform machine learning analysis 506-2 based on the transmitted data from the wearable device 504. Various embodiments include the use of any suitable machine learning training techniques to train a machine learning network for performing the machine learning analysis 506-2, including, but not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning algorithms.

Machine learning analysis may be used to determine acetone concentration and $CO_2$ concentrations in transdermal samples in the presence of various environmental conditions (i.e. humdity, temperature) and interferrents (i.e. ethanol).

Figure 6A:
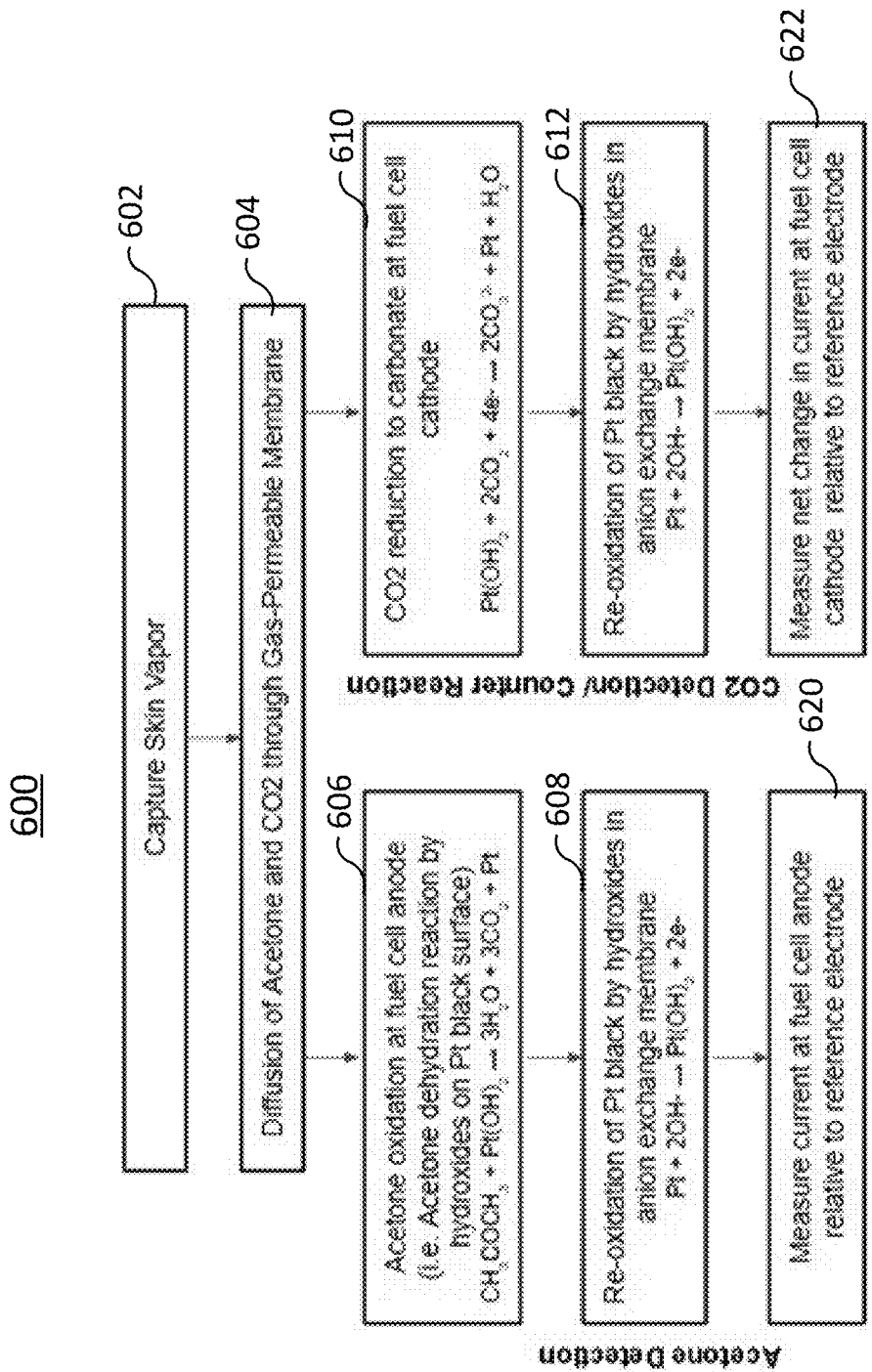
FIG. 6A is a diagram illustrating an exemplary method that may be performed in some embodiments.

FIG. 6A is a flowchart 600 illustrating an exemplary method that may be performed in some embodiments. The Sensor captures skin vapor. (step 602) Steps 604, 606, 608, 610, 612 illustrate chemical reactions occurring within the Sensor. Steps 620, 622 illustrate measurement steps occurring within the Sensor.

Figure 6B:
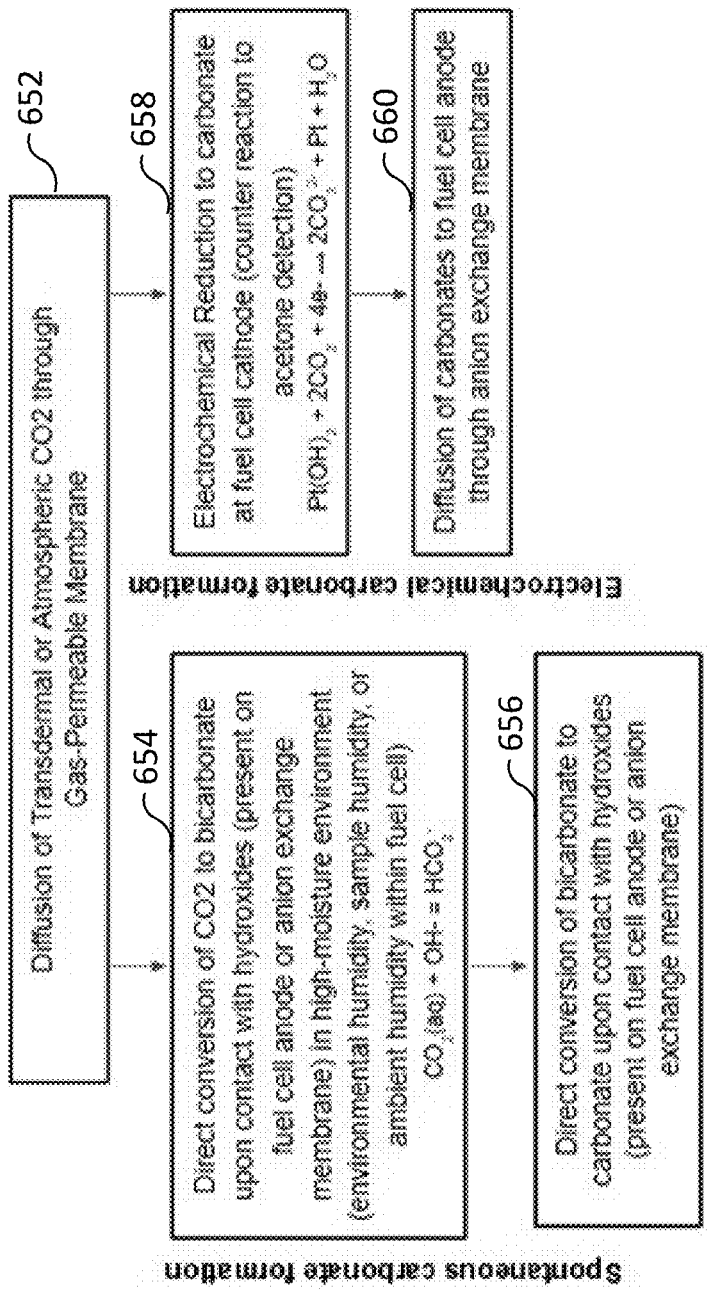
FIG. 6B is a diagram illustrating an exemplary method that may be performed in some embodiments.

FIG. 6B is a flowchart 650 illustrating an exemplary method that may be performed in some embodiments. Steps 652, 654, 656, 658, 660 illustrate chemical reactions occurring within the Sensor.

Figure 7:
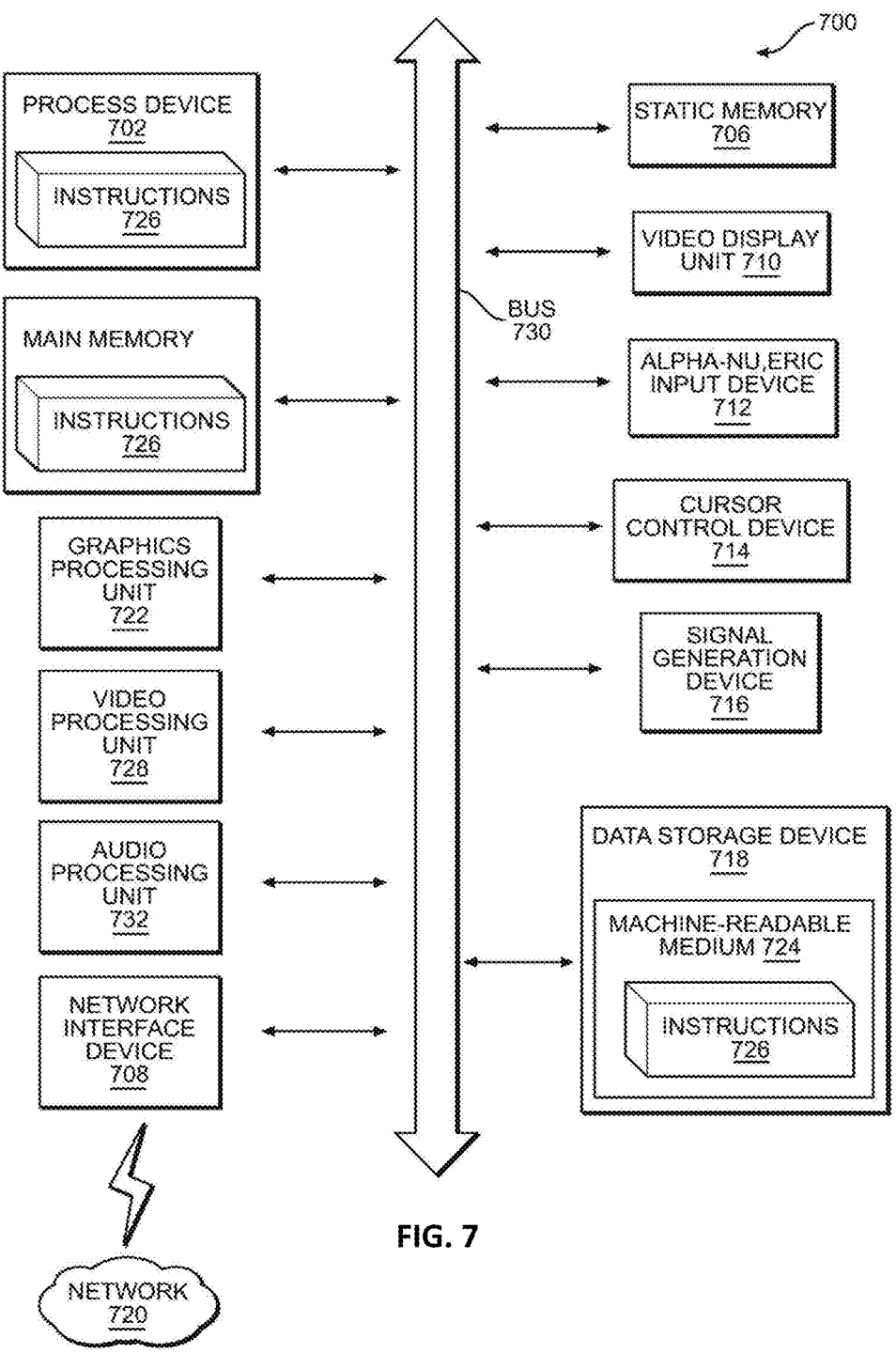
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A sensor device comprising:
   a gas impermeable enclosure;
   a carbonate removal cell enclosed within the gas impermeable enclosure;
   a gas permeable membrane housing the gas impermeable enclosure;
   a fuel cell anode adjacent to the gas permeable membrane; and
   at least a portion of a reference electrode enclosed by a first portion of the fuel cell anode, wherein a bottom surface of the carbonate removal cell is composed of a top surface of a second portion of the fuel cell anode; and wherein a top surface of the reference electrode and a top surface of the first portion of the fuel cell anode are in contact with a bottom surface of the gas permeable membrane.

2. The sensor device of claim 1, further comprising:
an anion exchange membrane adjacent to the fuel cell anode; and
a fuel cell cathode adjacent to the anion exchange membrane.

3. The sensor device of claim 2, wherein a top surface of the fuel cell cathode is in contact with the a bottom surface of the anion exchange membrane.

4. The sensor device of claim 2, wherein a bottom surface of the reference electrode and a bottom surface of the fuel cell anode are in contact with a top surface of the anion exchange membrane.

5. The sensor device of claim 1, wherein the carbonate removal cell and the reference electrode are physically oriented according to a misalignment as to each other.

6. The sensor device of claim 1, wherein the carbonate removal cell comprises:

a first electrolyte;
a second electrolyte;
a carbonate removal anode adjacent to the first electrolyte; and
a bipolar membrane situated between the first electrolyte and a second electrolyte.

7. The sensor device of claim 6, wherein the top surface of the second portion of the fuel cell anode concurrently serves as a cathode for the carbonate removal cell.

8. The sensor device of claim 6, wherein the second electrolyte is in contact with the top surface of the second portion of the fuel cell anode.

9. The sensor device of claim 8, wherein the first electrolyte comprises an alkaline electrolyte.

10. The sensor device of claim 9, wherein the second electrolyte comprises an acidic electrolyte.

11. The sensor device of claim 1, wherein the gas impermeable enclosure comprises a Teflon casing.

12. The sensor device of claim 1, wherein the gas permeable membrane comprises a membrane for receiving vapor emitted from skin.

* * * * *